United States Patent
Yoon et al.

(10) Patent No.: US 10,095,386 B2
(45) Date of Patent: Oct. 9, 2018

(54) MOBILE DEVICE FOR DISPLAYING VIRTUALLY LISTED PAGES AND DISPLAYING METHOD THEREOF

(71) Applicant: SAMSUNG ELECTRONICS CO., LTD., Suwon-si, Gyeonggi-do (KR)

(72) Inventors: Jin Yoon, Seoul (KR); Sung-jae Park, Suwon-si (KR); Moon-kyoung Park, Suwon-si (KR); Young-joo Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 236 days.

(21) Appl. No.: 14/995,370

(22) Filed: Jan. 14, 2016

(65) Prior Publication Data

US 2016/0224198 A1    Aug. 4, 2016

(30) Foreign Application Priority Data

Jan. 30, 2015  (KR) .................. 10-2015-0015583

(51) Int. Cl.
*G06F 3/0481* (2013.01)
*G06F 3/0483* (2013.01)
*G06F 3/0485* (2013.01)
*G06F 3/0488* (2013.01)

(52) U.S. Cl.
CPC .......... *G06F 3/0483* (2013.01); *G06F 3/0485* (2013.01); *G06F 3/04817* (2013.01); *G06F 3/0488* (2013.01)

(58) Field of Classification Search
CPC .......... G06F 3/017; G06F 3/041; G06F 3/048; G06F 3/0481; G06F 3/0482; G06F 3/0483; G06F 3/0485; G06F 3/0488
See application file for complete search history.

(56) References Cited

U.S. PATENT DOCUMENTS

| | | | | |
|---|---|---|---|---|
| 6,600,936 B1 * | 7/2003 | Karkkainen | .......... | G06F 3/0362 345/649 |
| 7,249,325 B1 * | 7/2007 | Donaldson | .......... | G06F 3/03547 345/169 |
| 2006/0268100 A1 * | 11/2006 | Karukka | ............... | G06F 3/0482 348/14.01 |
| 2009/0271723 A1 * | 10/2009 | Matsushima | .......... | G06F 3/0482 715/769 |
| 2010/0205563 A1 * | 8/2010 | Haapsaari | ............. | G06F 3/0482 715/825 |
| 2010/0281374 A1 * | 11/2010 | Schulz | .................. | G06F 3/0482 715/723 |
| 2011/0025711 A1 * | 2/2011 | Doi | ........................ | G06F 3/0485 345/635 |
| 2011/0296351 A1 * | 12/2011 | Ewing, Jr. | ............. | G06F 3/0346 715/841 |
| 2013/0185642 A1 * | 7/2013 | Gammons | ............. | G06F 3/0482 715/733 |

(Continued)

*Primary Examiner* — Xiomar L Bautista
(74) *Attorney, Agent, or Firm* — Nixon & Vanderhye P.C.

(57) ABSTRACT

A displaying method for a mobile device includes: displaying one of a plurality of virtually listed pages on a screen of the mobile device; receiving a scroll input on the displayed page; in response to the scroll input, inserting images, of execution screens of widgets corresponding to adjacent pages of the displayed page, into the adjacent pages. The plurality of pages may be sequentially displayed on the screen of the mobile device.

15 Claims, 19 Drawing Sheets

(56) References Cited

U.S. PATENT DOCUMENTS

| | | | | |
|---|---|---|---|---|
| 2014/0237360 A1* | 8/2014 | Chaudhri | ............ | G06F 3/04817 715/702 |
| 2014/0281956 A1* | 9/2014 | Anderson | ............. | G06F 3/0482 715/702 |
| 2014/0337791 A1* | 11/2014 | Agnetta | ................ | G06F 3/0481 715/784 |

* cited by examiner

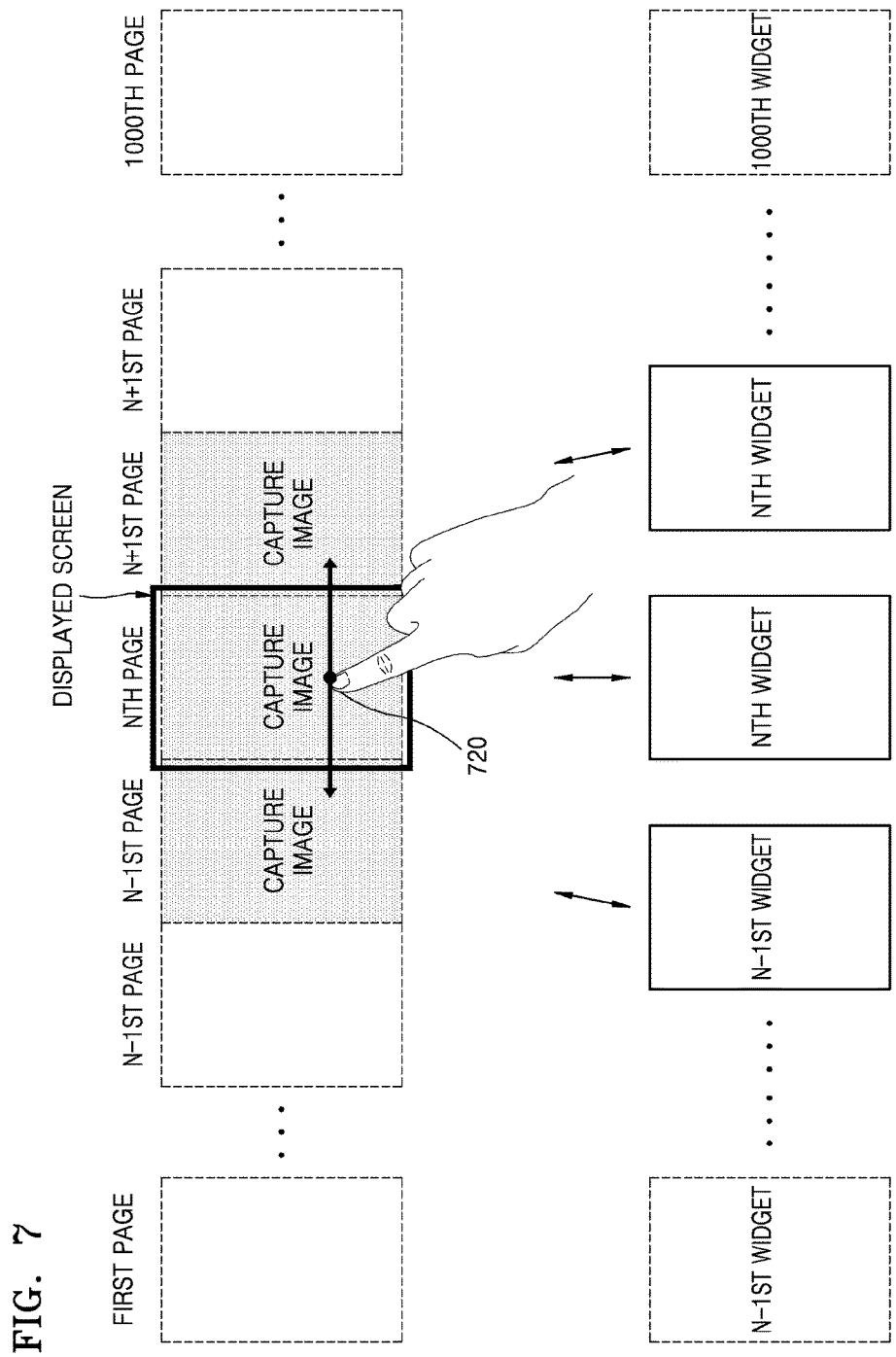

MOBILE DEVICE FOR DISPLAYING VIRTUALLY LISTED PAGES AND DISPLAYING METHOD THEREOF

CROSS-REFERENCE TO RELATED APPLICATION

This application is based on and claims priority under 35 U.S.C. § 119 to Korean Patent Application No. 10-2015-0015583, filed on Jan. 30, 2015, in the Korean Intellectual Property Office, the disclosure of which is incorporated by reference herein in its entirety.

BACKGROUND

1. Field

The disclosure relates to methods and apparatuses for a mobile device and a displaying method thereof.

2. Description of Related Art

A mobile device may provide various types of information to a user through a home screen. For example, the mobile device may display execution screens of various types of widgets on the home screen.

The mobile device may provide a home screen larger than a size of a screen of the mobile device to display various types of widgets on the home screen.

Therefore, if the user scrolls the home screen, the mobile device may update positions of the widgets displayed on the screen of the mobile device and may repeatedly perform image processing with respect to a plurality of layers included in the execution screens of the widgets. This type of repeated processing may increase a processing load of the mobile device.

Therefore, there is a need for a method of efficiently displaying a home screen through a mobile device and a mobile device employing the method.

SUMMARY

Additional aspects will be set forth in part in the description which follows and, in part, will be apparent from the description.

According to an aspect of an example embodiment, a displaying method of a mobile device, includes: displaying one of a plurality of virtually listed pages on a screen of the mobile device; receiving a scroll input for the displayed page; and in response to the scroll input, inserting images of execution screens of widgets corresponding to pages adjacent to the displayed page, into the adjacent pages. The plurality of pages that are virtually listed may be sequentially displayed on the screen of the mobile device.

The inserting of the images indicating the execution screens of the widgets may include: in response to the scroll input, capturing the execution screens of the widgets; and respectively inserting the captured images into the adjacent pages.

In response to the scroll input for the displayed page, the adjacent pages may be displayed on the screen of the mobile device.

If the adjacent pages are displayed, the captured images inserted into the adjacent pages may be updated at preset time intervals.

The displaying method may further include: generating containers respectively corresponding to the plurality of pages. The containers may store identification values of the pages, identification values of widgets corresponding to the pages, and the captured images of the execution screens of the widgets.

The widgets corresponding to the adjacent pages of the displayed page may include at least one of: a widget corresponding to an adjacent page positioned before the displayed page, and a widget corresponding to an adjacent page positioned after the displayed page.

The displaying method may further include: generating notification information; and generating a page into which the notification information is to be inserted. The generated page may be arranged with the plurality of pages.

The plurality of pages may include a home screen of the mobile device.

According to an aspect of another example embodiment, a mobile device includes: a display configured to display one of a plurality of virtually listed pages on a screen of the mobile device; an input unit comprising input circuitry configured to receive a scroll input for the displayed page; and a controller configured to insert images of execution screens of widgets corresponding to pages adjacent to the displayed page, into the adjacent pages based on the scroll input. The plurality of pages that are virtually listed may be sequentially displayed on the screen of the mobile device.

In response to the scroll input, the controller may be configured to capture the execution screens of the widgets and insert the captured images into the adjacent pages.

In response to the scroll input for the displayed page, the adjacent pages may be displayed on the screen of the mobile device.

If the adjacent pages are displayed, the controller may be configured to update the captured images inserted into the adjacent pages at preset time intervals.

The controller may be configured to generate containers respectively corresponding the plurality of pages. The containers may be configured to store identification values of the pages, identification values of the widgets corresponding to the pages, and the captured images of the execution screens of the widgets.

The widgets corresponding to the adjacent pages of the displayed page may include at least one of: a widget corresponding to an adjacent page positioned before the displayed page and a widget corresponding to an adjacent page positioned after the displayed page.

The controller may be configured to generate notification information and to generate a page into which the notification page is to be inserted. The generated page may be arranged with the plurality of pages.

The plurality of pages may include a home screen of the mobile device.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 7 illustrates an example scroll input received by a mobile device when 1000 pages are virtually listed;

DETAILED DESCRIPTION

Figure 1:
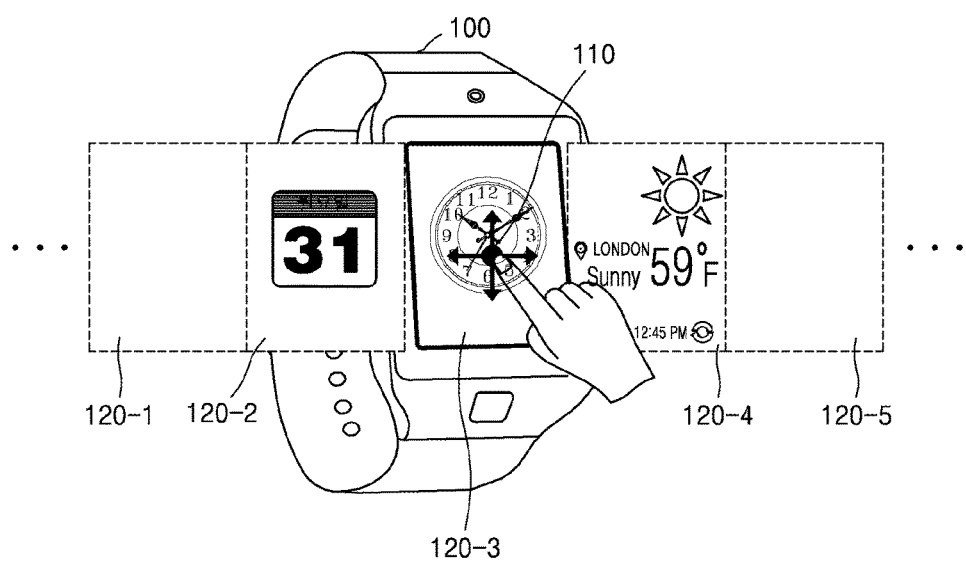
FIG. 1 illustrates example widgets displayed in a mobile device based on a received input.

Reference will now be made in greater detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are described below, by referring to the figures, to explain various aspects. Expressions such as "at least one of," when preceding a list of elements, modify the entire list of elements and do not necessarily modify the individual elements of the list.

The terms used herein will be described in brief, and the example embodiments will be described in greater detail.

The terms used herein are general terms that may be currently widely used in consideration of functions in the example embodiments but may vary based on intentions of those of ordinary skill in the art, precedents, appearances of new technologies, or the like. Also, the applicant may arbitrarily select terms in a particular case, and meanings of the terms corresponding to this case will be described in detail in the disclosure. Therefore, the terms used herein may be defined based on meanings thereof and the overall contents of the example embodiments and not necessarily based on names of simple terms.

When a part "comprises" an element in the disclosure, this may mean that the part may not exclude and may further include other elements as long as there is no contrary description. The term "unit" or "module" used herein refers to a unit that processes at least one function or operation may be realized as hardware (e.g., circuitry) or software or as a combination of hardware and software.

Also, an input (e.g., a user input) may include at least one selected from a touch input, a bending input, a voice input, a button input, and a multimodal input, or the like, but is not limited thereto.

A touch input may be, for example, a touch gesture that is performed on a touch screen to control a mobile device by a user. For example, the touch input described herein may include tap, touch & hold, touch & drag, double tap, drag, panning, flick, swipe, drag & and drop, etc. but is not limited thereto.

FIG. 1 illustrates example widgets displayed through a mobile device 100 based on a received input.

Referring to FIG. 1 the mobile device 100 may, for example, provide various types of widgets through a home screen. For example, the mobile device 100 may provide various types of widgets, such as a clock widget, a weather widget, a calendar widget, a schedule widget, a news widget, a search widget, a map widget, a memo widget, etc., through the home screen.

If the number of widgets that are provided through the home screen increases, the mobile device 100 may result in a home screen larger than a size of a screen of the mobile device 100. In this case, a user may be provided with various types of widgets by scrolling the home screen.

According to example embodiments, the mobile device 100 may, for example, generate pages 120-1 through 120-5 that are listed in a line to make up the home screen. Also, the mobile device 100 may insert captured images into some (e.g., 120-2 through 120-4) of the pages 120-1 through 120-5. For example, the capture images may be obtained by capturing execution screens of widgets.

If the user scrolls the home screen (110), the mobile device 100 may move the pages 120-1 and 120-5 while the other pages (e.g., 120-1 and 120-5) are empty except some pages (e.g., 120-2 through 120-4). Therefore, the mobile device 100 may perform an updating of positions of the widgets on the home screen and may perform image processing respectively for the widgets with respect to only some pages (e.g., 120-2 through 120-4). Therefore, the mobile device 100 may reduce a processing load according to a scroll input.

The mobile device 100 may, for example, be a smartphone, a tablet PC, a PC, a smart TV, a portable phone, a personal digital assistant (PDA), a laptop PC, a media player, a micro server, a global positioning system (GPS), an e-book terminal, a digital broadcast terminal, a navigation system, a kiosk PC, an MP3 player, a digital camera, other mobile or non-mobile computing devices, or the like, but is not limited thereto. Also, the mobile device 100 may, for example, be a wearable device, such as a clock, glasses, a hairband, a ring, or the like, having a communication function and a data processing function. However, the mobile device 100 is not limited thereto and thus may include all types of devices that may provide widgets through a home screen.

Figure 2:
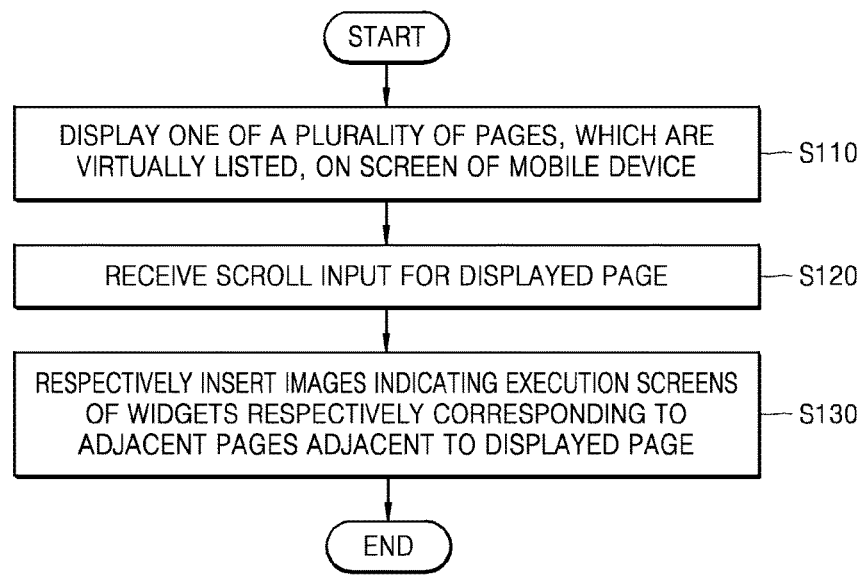
FIG. 2 is a flowchart illustrating an example method of displaying a screen in a mobile device.

FIG. 2 is a flowchart illustrating an example method of displaying a screen through a mobile device.

Referring to FIG. 2, in operation S110, the mobile device 100 displays one of a plurality of pages, which are virtually listed, on a screen of the mobile device 100. For example, a page may be a unit area made up of a home screen of the mobile device 100. The mobile device 100 may display an execution screen of at least one widget on a page.

According to example embodiments, a size of a page may correspond to a size of the screen of the mobile device 100. In this case, the mobile device 100 may display one of the plurality of pages on the screen of the mobile device 100. In another example, the size of the page may be half of the size of the screen of the mobile device 100. In this case, the mobile device 100 may display two of the plurality of pages on the screen.

The mobile device 100 may also generate containers respectively corresponding to the plurality of pages that are listed. The containers may store identification values of the pages, identification values of widgets corresponding to the pages, and display data. For example, the identification values of the pages may include serial numbers of the pages, address information (e.g., address "0x60001000" on a memory) in which the pages are stored, etc. Also, the identification values of the widgets may include, for example, names of the widgets, addresses in which the widgets are stored, etc. In addition, the display data may, for example, include imaging data that is inserted into the pages to be displayed on the screen of the mobile device 100.

The containers may also respectively include order information of all the listed pages. For example, the order information may be numbers of the pages and may be expressed with integers. The mobile device 100 may virtually list the plurality of pages based on the order information.

The containers may include, for example, position information (e.g., coordinate information) of the pages respectively with respect to the screen of the mobile device 100. For example, if the size of the screen of the mobile device 100 is 400×600, and the plurality of pages are listed in a direction of an X axis, a page displayed on the screen may have coordinate information (0, 0) through (400, 600). A page positioned next to the displayed page may have coordinate information of (401, 0) through (800, 1200).

The mobile device 100 may display an execution screen of a widget corresponding to a page displayed on the screen of the mobile device 100 based on a container. For example, the mobile device 100 may store imaging data for displaying the execution screen of the widget in a display data field of the container corresponding to the displayed page.

In operation S120, the mobile device 100 receives a scroll input for the displayed page. According to example embodiments, the scroll input may, for example, be a touch input for the screen of the mobile device 100. For example, the mobile device 100 may receive a touch input such as dragging, flicking, or swiping the screen of the mobile device 100, etc.

The scroll input may, for example, be a touch input of a user for a scroll bar displayed on the screen of the mobile device 100.

If the mobile device 100 receives a scroll input, the mobile device 100 respectively inserts images, of or indicating execution screens of widgets respectively corresponding to adjacent pages of the displayed page, into the adjacent pages in operation S130.

For example, the adjacent pages may be a page positioned before the displayed page and a page positioned after the displayed page. For example, the mobile device 100 may acquire the adjacent pages based on the order information (or the coordinate information) of the pages included in the containers.

The images of the execution screens of the widgets may be captured images that are formed by capturing the execution screens of the widgets. Also, a job of the mobile device 100 that respectively inserts the images indicating the execution screens of the widgets into the adjacent pages may be a job of the mobile device 100 that stores image data corresponding to the captured images in display data fields of containers respectively corresponding to the adjacent pages.

According to example embodiments, if the mobile device 100 receives the scroll input, the mobile device 100 may acquire information about widgets corresponding to the adjacent pages. For example, if the widgets are loaded on a memory, the mobile device 100 may acquire address information of the widgets on the memory. If the widgets are not loaded on the memory, the mobile device 100 may load the widgets into the memory.

The mobile device 100 may set widgets, which are not displayed on the screen of the mobile device 100, to pause states. If the widgets are in the pause states, the mobile device 100 may not update the execution screens of the widgets because the widgets are not displayed on the screen of the mobile device 100. This is to avoid unnecessary image processing.

Therefore, the mobile device 100 may display the widgets on a virtual screen to capture the execution screens of the widgets that are updated in real time. For example, the mobile device 100 may set fake coordinate information with respect to each of the widgets to display the widgets on the virtual screen.

The mobile device 100 may capture the execution screens of the widgets displayed on the virtual screen. The mobile device 100 may also insert the captured images into the adjacent pages.

Figure 3A:
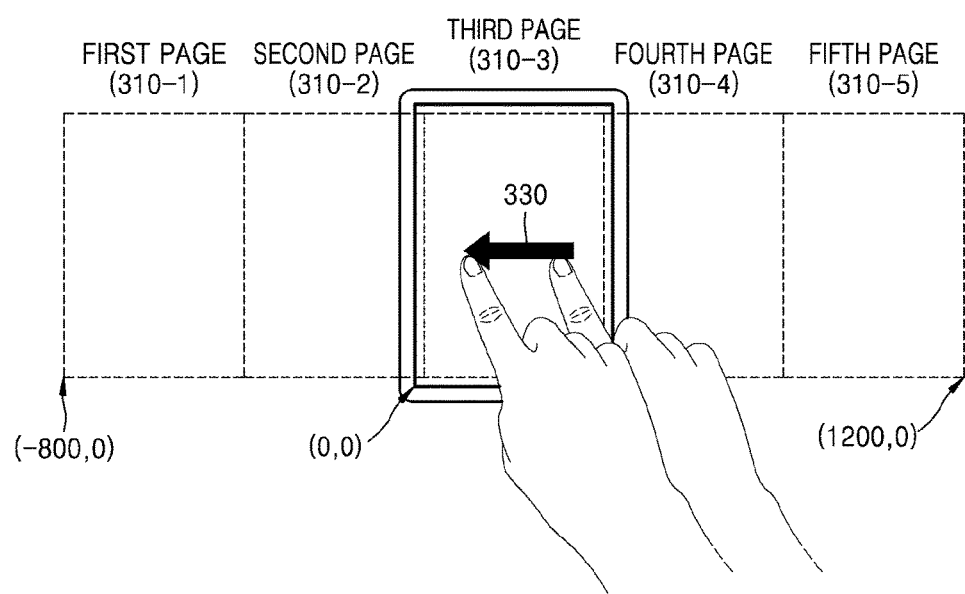
FIGS. 3A and 3B illustrate a plurality of virtually listed pages.
Figure 3B:
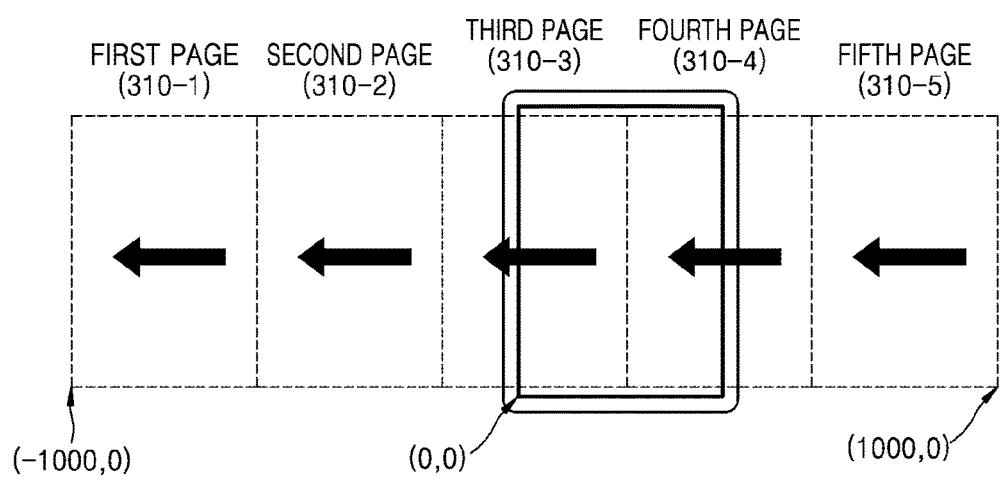

FIGS. 3A and 3B illustrate a plurality of example pages that are virtually listed.

As illustrated in FIG. 3A, a home screen may include virtually listed pages 310-1 through 310-5. The mobile device 100 may, for example, display a third page 310-3 of the virtually listed pages 310-1 through 310-5 on the screen of the mobile device 100.

The mobile device 100 may also receive a scroll input 330 for a displayed page.

If the scroll input 330 is received, the virtually listed pages 310-1 through 310-5 may in a direction where the scroll input 330 is received as shown in FIG. 3B. Therefore, the virtually listed pages 310-1 through 310-5 may be sequentially displayed on the screen of the mobile device 100.

The mobile device 100 may update position information that pages respectively have with respect to the screen of the mobile device 100. As the position information is updated, the mobile device 100 may perform image processing with respect to display data stored in containers corresponding to the pages 310-1 through 310-5.

Figure 4A:
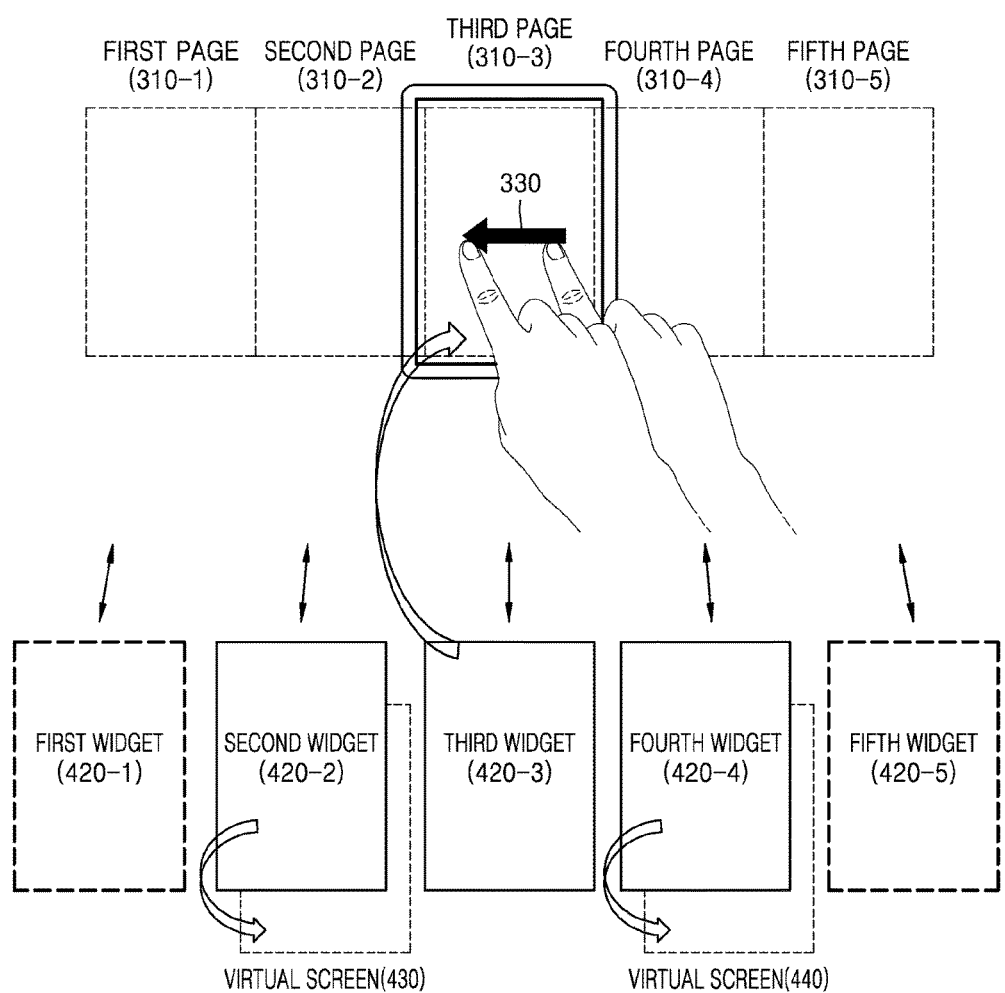
FIGS. 4A and 4B illustrate example widgets corresponding to adjacent pages of a page displayed on a screen of an example mobile device displayed on a virtual screen in a mobile device.
Figure 4B:
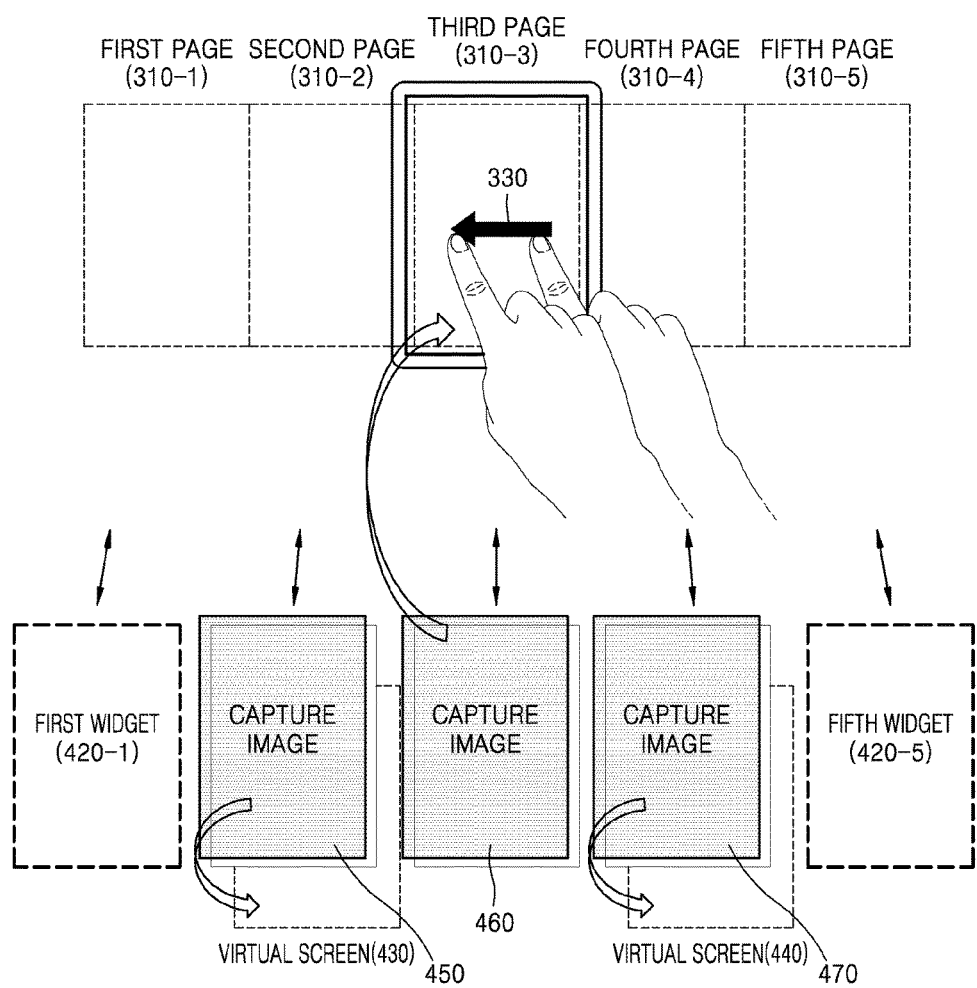

FIGS. 4A and 4B illustrate example widgets that correspond to adjacent pages of a page displayed on the screen of the mobile device 100 and are displayed on a virtual screen through the mobile device 100.

Referring to FIG. 4A, the mobile device 100 may enable the pages 310-1 through 310-5 to respectively correspond to widgets 420-1 through 420-5.

According to example embodiments, the mobile device 100 may display an execution screen of a third widget 420-3 corresponding to a third page 310-3 of the pages 310-1 through 310-5. For example, the mobile device 100 may store imaging data, indicating the execution screen of the third widget 420-3, in a display data field of a container corresponding to the third page 310-3.

Display data fields of containers corresponding to the pages 310-1, 310-2, 310-4, and 310-5 except the third page 310-3 may be empty.

If a scroll input 330 for a currently displayed page is received, the mobile device 100 may acquire information about second and fourth widgets 420-2 and 420-4 corresponding to adjacent pages 310-2 and 310-4 adjacent to the third page 310-3.

According to example embodiments, if the second and fourth widgets 420-2 and 420-4 are in pause states, the mobile device 100 may respectively display the second and fourth widgets 420-2 and 420-4 on virtual screens 430 and 440. Therefore, the mobile device 100 may change the second and fourth widgets 420-2 and 420-4 from pause states into normal execution states.

In FIG. 4A, widgets marked with solid lines denote widgets that are in normal execution states, and widgets marked with dotted lines denote widgets that are in pause states or end states.

As illustrated in FIG. 4B, the mobile device 100 may insert captured images 450, 460, and 470 into the second through fourth pages 310-2 through 310-4. For example, execution screens of the second through fourth widgets 420-2 through 420-4 are captured to form the captured images 450, 460, and 470.

The mobile device 100 may change the second through fourth widgets 420-2 through 420-4 from the pause states into the normal execution states to capture an execution screen of a widget that is updated in real time. For example, if a widget is a clock widget, and the mobile device 100 captures an execution screen of the clock widget (i.e., a clock widget that is not updated in real time) that is in a pause state, the user may be provided with time information about passed time.

Also, the mobile device 100 may capture a widget of a normal execution state at preset time intervals. For example, the mobile device 100 may capture an execution screen of a clock widget at every one second interval.

In the above description, if a scroll input is received, the mobile device 100 inserts a captured image into an adjacent page of a currently displayed page but is not limited thereto. For example, the mobile device 100 may capture execution screens of widgets corresponding to second adjacent pages adjacent to an adjacent page and insert captured images into the second adjacent pages.

If a new page of a plurality of pages is displayed on a screen, the mobile device 100 may insert an image, indicating an execution screen of a widget corresponding to the new page, into the new page. For example, the mobile device 100 may release an image inserted into a previous page.

Figure 5:
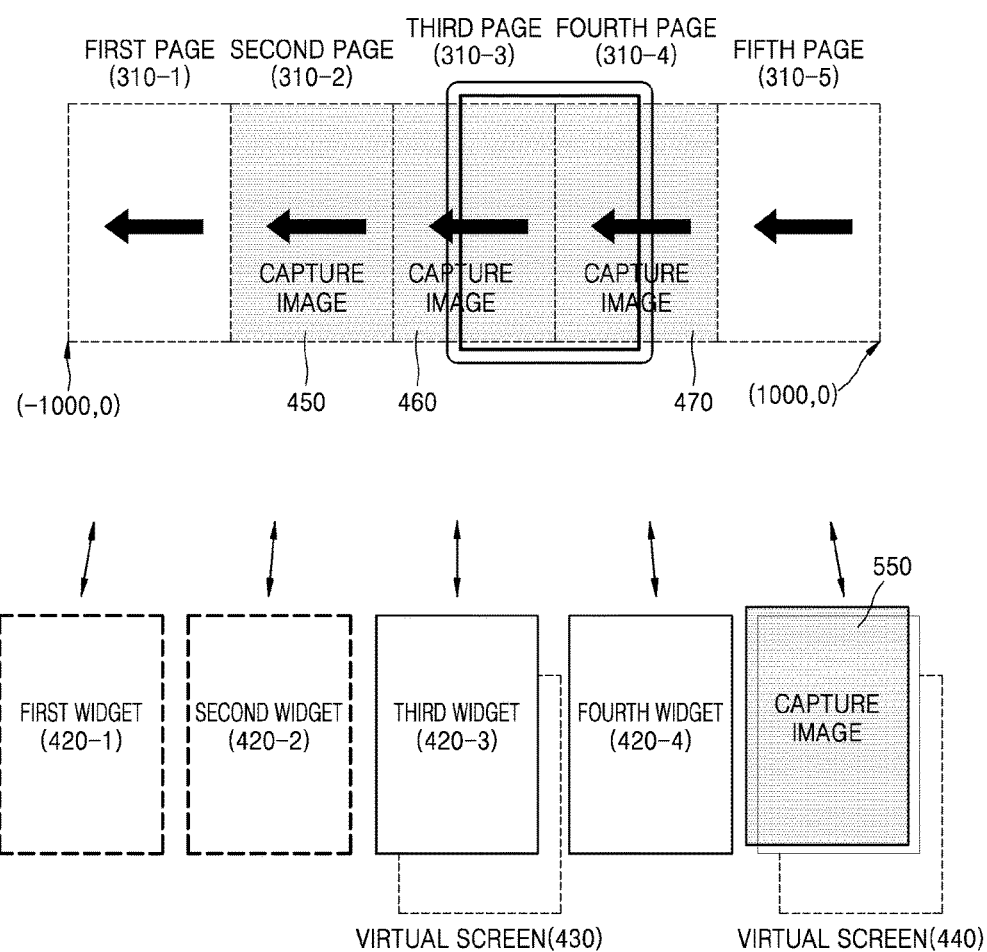
FIG. 5 illustrates an example plurality of pages into which captured images are inserted and sequentially displayed in a mobile device.

FIG. 5 illustrates an example of a plurality of pages into which captured images are inserted and which are sequentially displayed.

Referring to FIG. 5, the mobile device 100 may sequentially move pages 310-1 through 310-5 based on a scroll input. For example, captured images 450, 460, and 470 may be inserted into second through fourth pages 310-2 through 310-4, and other pages may be empty.

As the pages 310-1 through 310-5 move, the mobile device 100 may update position information of the pages 310 through 310-5. The mobile device 100 may also update position information of the captured images 450, 460, and 470 inserted into some of the pages 310-1 through 310-5.

According to example embodiments, the mobile device 100 may move other pages except some pages into empty states to reduce a processing load of the mobile device 100 that is taken for updating position information.

The mobile device 100 may also perform image processing with respect to images inserted into the pages 310-1 through 310-5. For example, the mobile device 100 may perform image processing with respect to display data stored in containers respectively corresponding to the pages 310-1 through 310-5.

Figure 6A:
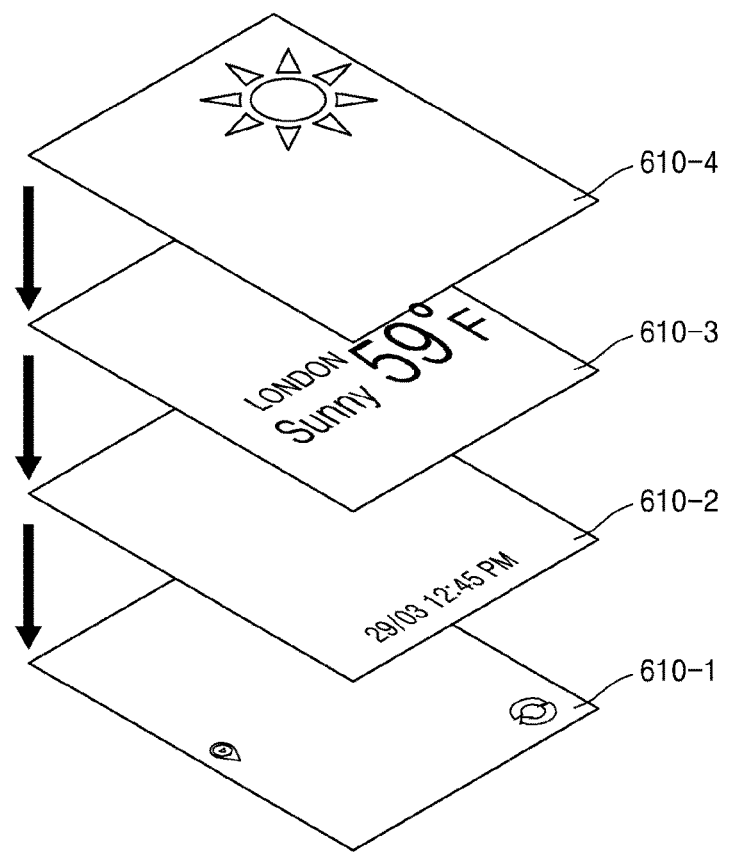
FIGS. 6A and 6B illustrate example imaging data on which a mobile device performs image processing.
Figure 6B:
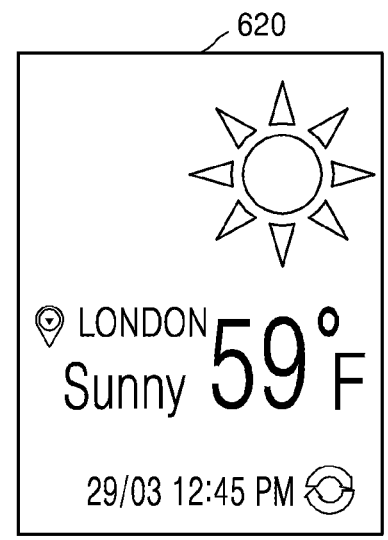

FIGS. 6A and 6B illustrate example imaging data on which the mobile device 100 performs image processing.

As illustrated in FIG. 6A, an execution screen of a widget may include a plurality of layers 610-1 through 610-4.

Therefore, imaging data corresponding to the execution screen of the widget may include image data respectively corresponding to the plurality of layers 610-1 through 610-4.

As illustrated in FIG. 6B, the mobile device 100 may perform image processing with respect to a captured image 620. For example, the execution screen is captured to form the captured image 620.

The captured image 620 may be expressed on one layer. Therefore, the mobile device 100 may perform image processing with respect to the captured image 620 instead of performing image processing with respect to the imaging data corresponding to the execution screen of the widget, to reduce a processing load that is taken for image processing of the mobile device 100.

Referring to FIG. 5 again, the mobile device 100 may display the fourth page 310-4 after the third page 310-3 based on the scroll input 330 of FIG. 4B. Therefore, the mobile device 100 may display the captured image 470 corresponding to the fourth page 310-4 on the screen.

If the scroll input 330 of FIG. 4B is ended, the mobile device 100 may display an execution screen of the fourth widget 420-4 instead of the captured image 470. For example, the mobile device 100 may store imaging data corresponding to the execution screen of the fourth widget 420-4 in a display data filed of a container corresponding to the fourth page 310-4.

If the scroll input 330 of FIG. 4B is kept, the mobile device 100 may change a fifth widget 420-5 corresponding to the fifth page 310-5, which is adjacent to the displayed fourth page 310-4, from a pause state into a normal execution state. Also, the mobile device 100 may change the second widget 420-2 corresponding to the second page 310-2, which is not adjacent to the fourth page 310-4, from a normal execution state into a pause state or an end state.

The mobile device 100 may also insert a captured image 550 into the fifth page 310-5, wherein the execution screen of the fifth widget 420-5 is captured to form the captured image 550. Also, the mobile device 100 may release the captured image 450 inserted into the second page 310-2. For example, the mobile device 100 may delete display data of a container corresponding to the second page 310-2.

Also, according to example embodiments, although the number of widgets provided on a home screen increases, the mobile device 100 may not reduce a performance of the mobile device 100.

For example, as illustrated in FIG. 7, the mobile device 100 may receive a scroll input 720 when 1000 pages are virtually listed. The mobile device 100 may insert images, which are formed by capturing execution screens of widgets corresponding to adjacent pages of an $N^{th}$ page that is currently displayed, into an $N-1^{st}$ page, an $N^{th}$ page, and an $N+1^{st}$ page and may move other pages that are empty.

Therefore, although the number of pages increases, a processing load that is performed by the mobile device 100 to update position information of widgets respectively inserted into pages and a processing load that is performed to process imaging data of the widgets may be constant.

Figure 8:
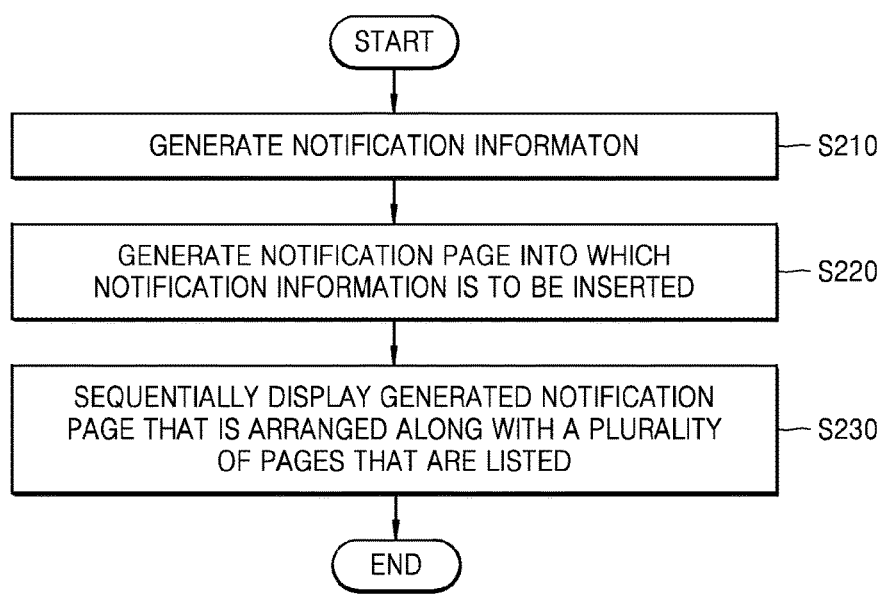
FIG. 8 is a flowchart illustrating an example method of displaying notification information in a mobile device.

FIG. 8 is a flowchart illustrating an example method of displaying notification information through the mobile device 100.

Referring to FIG. 8, in operation S210, the mobile device 100 generates notification information. The mobile device 100 may generate the notification information to provide a user with letter information, chatting information, event notification information, etc. that are received from an external source. The mobile device 100 may generate the notification information to provide the user with event notification information, etc. that are generated from an internal source.

In operation S220, the mobile device 100 may generate a page (hereinafter referred to as a notification page) into which the notification information will be inserted. The mobile device 100 may also generate a container corresponding to the notification page. For example, the container may include a page identification value, an identification value of the notification information, and display data. The identification value of the notification information may be, for example, address information in which the notification information is stored.

In operation S230, the mobile device 100 arranges the notification page along with a plurality of pages that are listed.

According to example embodiments, the mobile device 100 may arrange the notification page in a preset position. For example, the mobile device 100 may set order information of the container corresponding to the notification page in a negative number. For example, order information of containers corresponding to notification pages may be expressed in −1, −2, −3, etc. Therefore, the notification pages may be arranged on a left side of a page having order information "1".

If a scroll input is received, the mobile device 100 may sequentially display the notification pages that are listed along with the plurality of listed pages.

When the notification page and a page (hereinafter referred to as a widget page) into which an image indicating an execution screen of a widget will be inserted are displayed on the screen of the mobile device 100, the mobile device 100 may apply different display effects to the notification page and the widget page. For example, a display effect may include an effect of gradually enlarging and displaying a page, an effect of enabling a page to appear from a back of a screen, an effect of flying a page from a part of the screen, etc.

The mobile device 100 may apply different display effects to the plurality of pages.

Figure 9:
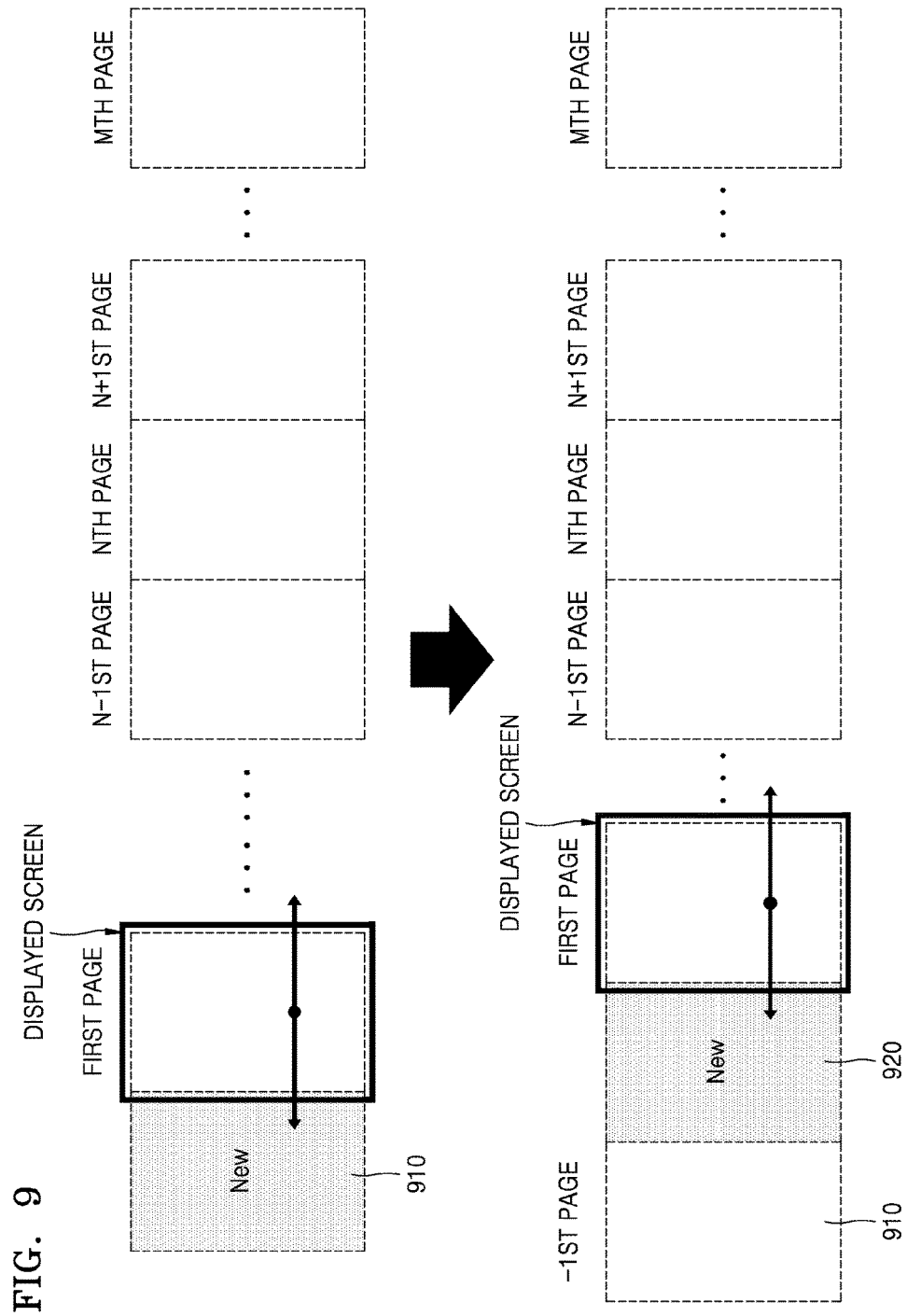
FIG. 9 illustrates example notification pages arranged along with a plurality of listed widget pages in a mobile device.

FIG. 9 illustrates example notification pages that are arranged along with a plurality of widget pages that are listed.

Referring to FIG. 9, the mobile device 100 may generate first notification information and generate a notification page 910 into which the first notification information will be inserted. The mobile device 100 may also set order information of a container corresponding to the notification page 910 to "−1".

If the mobile device 100 generates second notification information, the mobile device 100 may generate a notification page 920 into which the second notification information will be inserted. The mobile device 100 may also set order information of a container corresponding to the notification page 920 to "−1". In this case, the order information of the notification page 910 may be changed into "−2".

If a scroll input for a first widget page is received, the mobile device 100 may sequentially display the notification pages 910 and 920 that are arranged on a left side of the first widget page.

As described above, the mobile device 100 may divide positions, in which widget pages and pages corresponding to notifications are arranged, so as to enable a user to intuitively access information (e.g., widget information or notification information) desired by the user.

Figure 10:
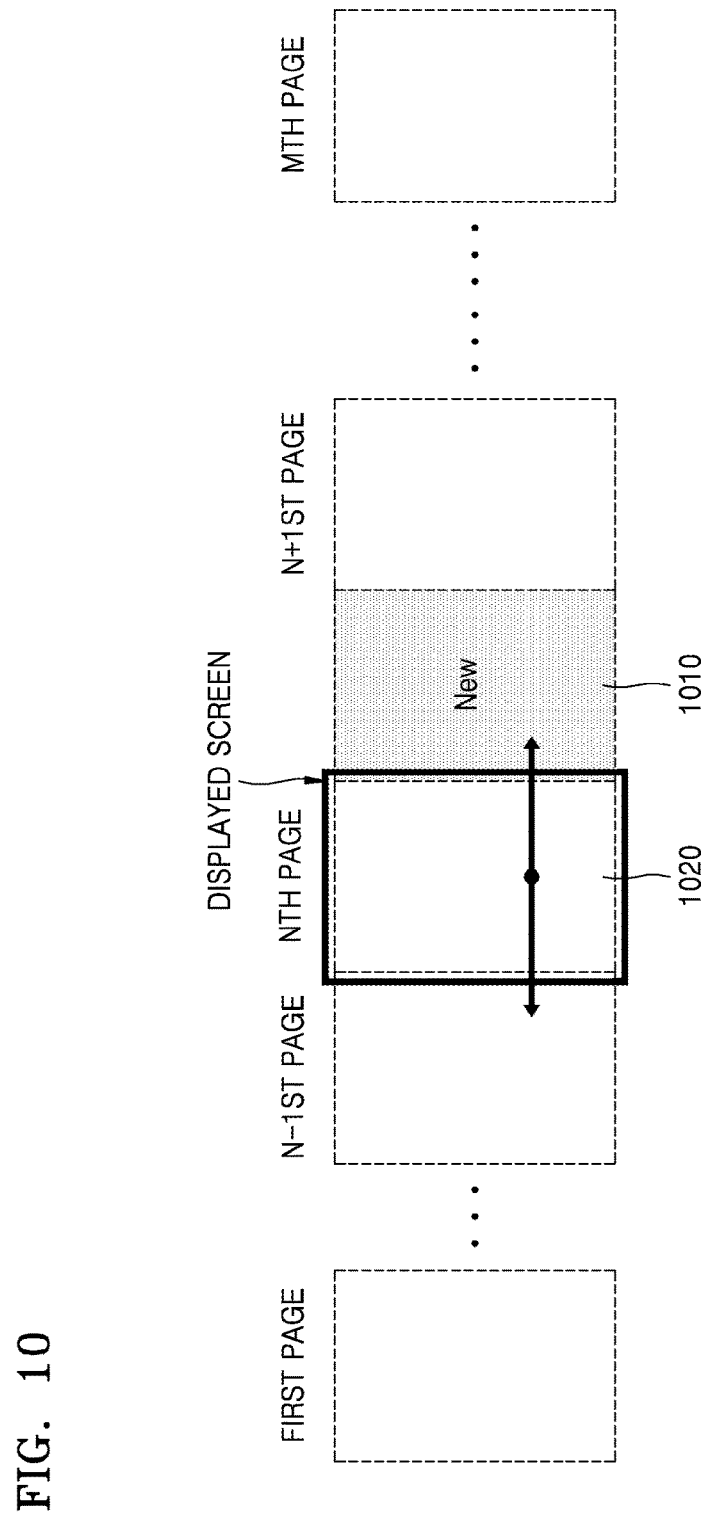
FIGS. 10 and 11 illustrate an example new widget page generated in a mobile device, and into which an execution screen of a widget will be inserted.
Figure 11:
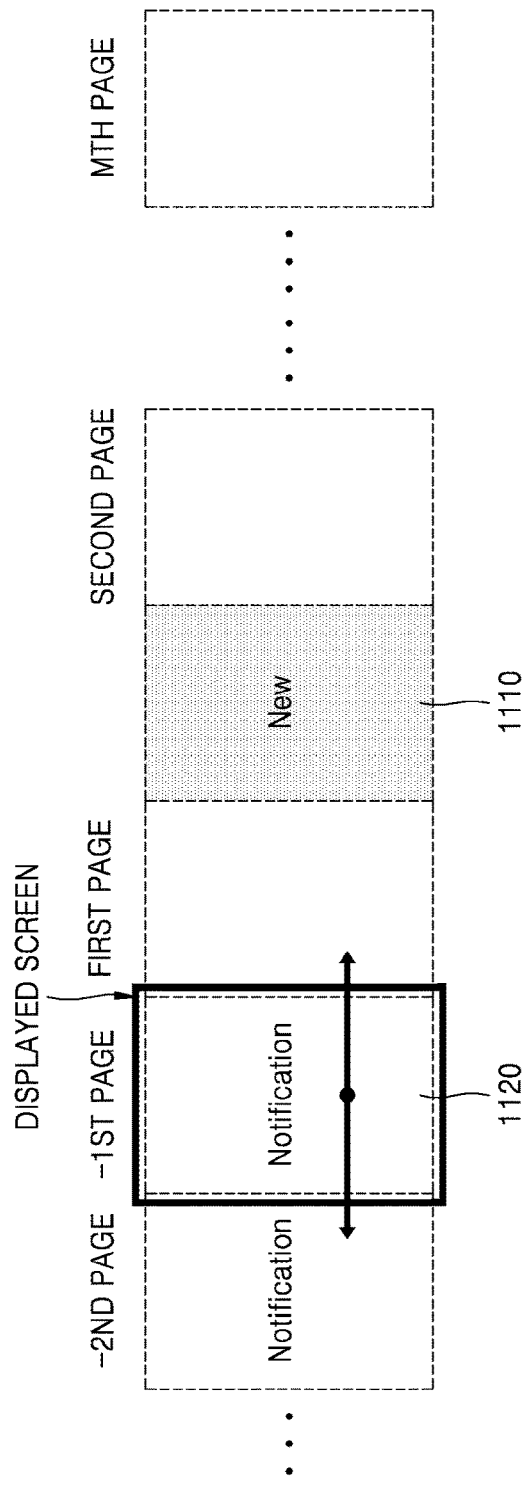

FIGS. 10 and 11 illustrate an example new widget page into which an execution screen of a widget will be inserted through the mobile device 100.

According to example embodiments, if a new widget is executed, the mobile device 100 may generate a widget page 1010. The mobile device 100 may also arrange the widget page 1010 in a preset position.

For example, as illustrated in FIG. 10, the mobile device 100 may arrange the widget page 1010 in a next position of a page 1020 displayed on the screen of the mobile device 100.

As illustrated in FIG. 11, if the mobile device 100 displays a notification page 1120, the mobile device 100 may arrange a generated widget page 1110 in a next page of a first widget page of a plurality of pages.

Figure 12:
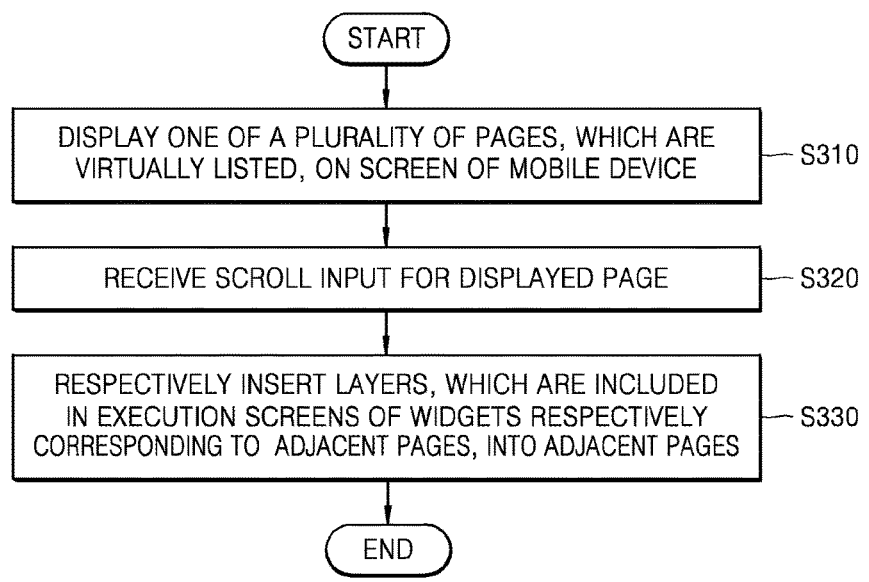
FIG. 12 is a flowchart illustrating an example method of displaying a screen in a mobile device.

FIG. 12 is a flowchart illustrating an example method of displaying a screen through the mobile device 100.

Referring to FIG. 12, in operation S310, the mobile device 100 displays one of a plurality of pages, which are virtually listed, on the screen of the mobile device 100. In operation S320, the mobile device 100 receives a scroll input for the displayed page. Operations S310 and S320 respectively correspond to operations S110 and S120 of FIG. 2, and thus their detailed descriptions are omitted here.

In operation S330, the mobile device 100 respectively inserts layers, which are included in execution screens of widgets respectively corresponding to adjacent pages of the displayed page, into the adjacent pages. For example, the mobile device 100 may acquire information about the widgets respectively corresponding to the adjacent pages. The mobile device 100 may also insert the layers (e.g., the layers of FIG. 6A), which are included in the execution screens of the widgets respectively corresponding to the adjacent pages, into display data of containers respectively corresponding to the adjacent pages. Therefore, if a scroll input is received, the mobile device 100 may update position information of each of a plurality of layers inserted into the adjacent pages.

Even in this case, display data of containers corresponding to pages other than the adjacent pages may be empty.

If a first adjacent page of the adjacent pages is displayed on the screen of the mobile device 100 based on the scroll input, the mobile device 100 may change a widget corresponding to the first adjacent page from a pause state into a normal execution state. The mobile device 100 may also update the display data of the container corresponding to the first adjacent page.

Figure 13:
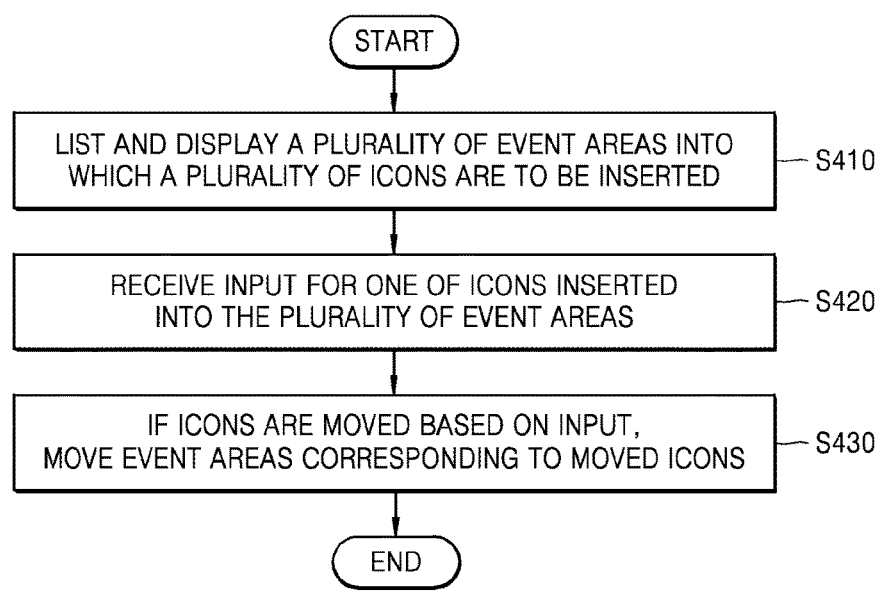
FIG. 13 is a flowchart illustrating an example method of displaying an icon in a mobile device.

FIG. 13 is a flowchart illustrating an example method of displaying an icon through the mobile device 100.

Referring to FIG. 13, in operation S410, the mobile device 100 lists and displays a plurality of event areas into which a plurality of icons may be inserted. For example, an event area may be an area having the same shape and size as an icon and may be an area that receives a preset event.

According to example embodiments, the mobile device 100 may change a shape of an event area that receives an event, based on a shape (e.g., a circle, a triangle, or the like) of an icon. The mobile device 100 may also change the event received in the event area. The mobile device 100 may change a response operation to the received event based on the event area that receives the event.

In operation S420, the mobile device 100 receives an input for one of the icons inserted into the plurality of event areas.

According to example embodiments, the mobile device 100 may receive an input that moves a position of a first icon of a plurality of icons from a first event area into a second event area. For example, the mobile device 100 may receive an input that drags and drops the first icon from the first event area into the second event area.

As the first icon is moved, some of the other icons may be moved into next event areas of event areas respectively corresponding to the some icons.

For example, the first icon may overlap with a second icon corresponding to the second event area. In this case, the mobile device 100 may move the second icon into a third event area positioned after the second event area. The mobile device 100 may also repeatedly move positions of the icons.

If the icons are moved based on an input, the mobile device 100 moves event areas corresponding to the moved icons in operation S430.

If shapes of event areas into which icons are inserted are the same, the mobile device 100 may change event areas corresponding to the icons without moving the event areas.

Figure 14:
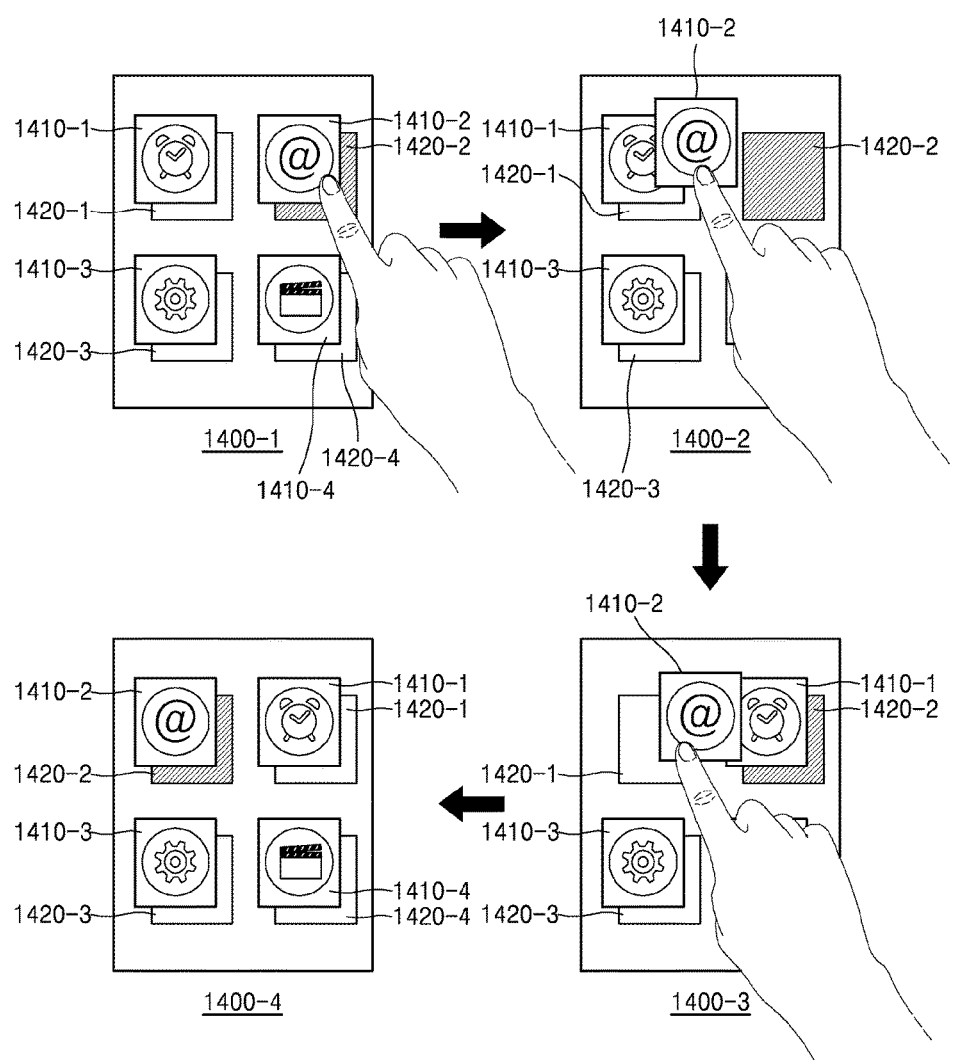
FIG. 14 illustrates example icons displayed in a mobile device.

FIG. 14 illustrates example icons that are displayed through the mobile device 100.

Referring to FIG. 14, event areas 1420-1 through 1420-4 into which icons 1410-1 through 1410-4 are inserted may, for example, be arranged in a 2×2 matrix.

The mobile device 100 may receive an input that drags and drops a second icon 1410-2 (1400-1 through 1400-3).

The mobile device 100 may move the second icon 1410-2 into a first event area 1420-1 and may move a first icon 1410-1, which is inserted into the first event area 1420-1, into a second event area 1420-2. Thereafter, the mobile device 100 may move the first event area 1420-1 and the second event area 1420-2 (1400-4).

If an input that moves a third icon 1410-3 into the first event area 1420-1 is received, the mobile device 100 may move the first icon 1410-1 into the second event area 1420-2 and then may move the second icon 1410-2 into the third event area 1420-3.

Figure 15:
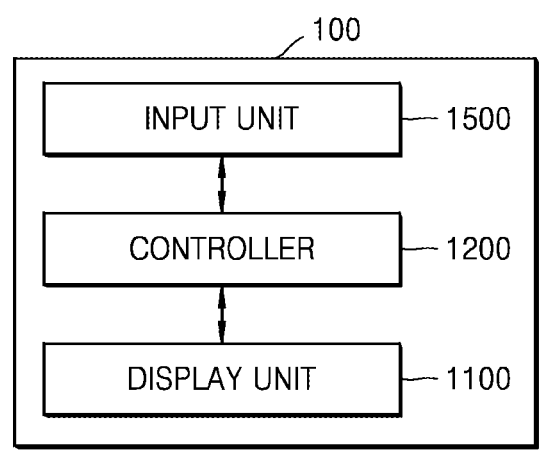
FIGS. 15 and 16 are block diagrams illustrating an example structure of a mobile device.
Figure 16:
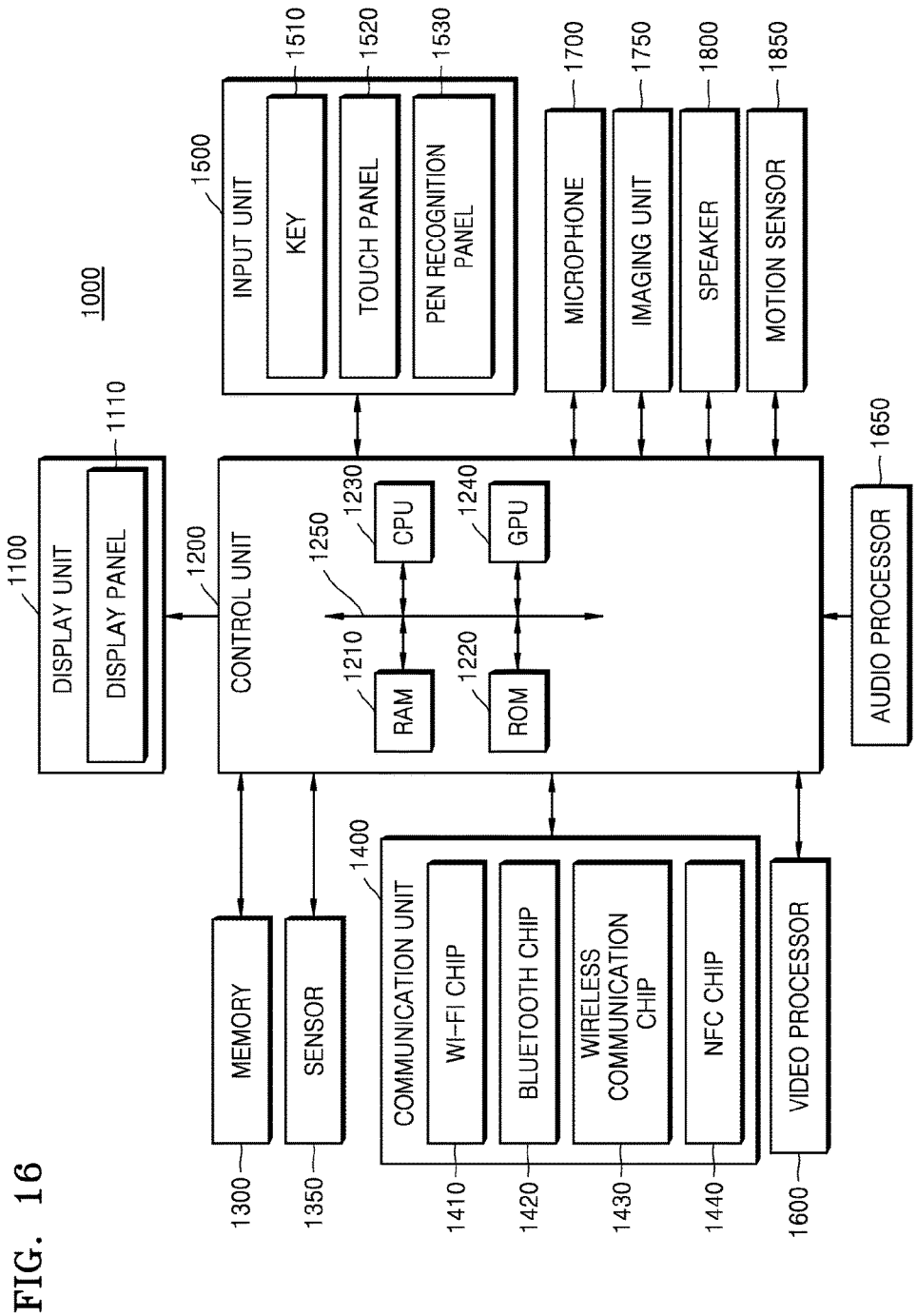

FIGS. 15 and 16 are block illustrating an example structure of the mobile device 100.

According to example embodiments, the mobile device 100 may be, for example, applied to various types of devices such as a portable phone, a tablet PC, a PDA, an MP3 player, a kiosk PC, an electronic frame, a navigation apparatus, a digital TV, a wearable device, etc.

As illustrated in FIG. 15, the mobile device 100 may include, for example, an input unit (e.g., including input circuitry) 1500, a controller 1200, and a display unit (e.g., including a display) 1100 but is not limited thereto.

For example, besides the input unit 1500, the controller 1200, and the display unit 1100, the mobile device 100 may further include a memory 1300, a sensor 1350, a communicator (e.g., including communication circuitry) 1400, a video processor 1600, an audio processor 1650, a microphone 1700, an imaging unit 1750, a speaker 1800, and a motion sensor 1850 as illustrated in FIG. 16.

The display unit 1100 may include, for example, a display panel 1110 and a controller (not shown) that controls the display panel 1110. The display panel 1110 may be realized as various types of displays such as a liquid crystal display (LCD), an organic light-emitting diode (OLED) display, an active-matrix (AM)-OLED, a plasma display panel, etc. The display panel 1100 may be realized to be flexible, transparent, or wearable. The display unit 1100 may be combined with a touch panel 1520 of the input unit 1500 to be provided as a touch screen (not shown). For example, the touch screen may include an all-in-one module where the display panel 1110 and the touch panel 1520 are combined in a stack structure. The touch screen may also further include a resistive sensor in a part of the all-in-on module where the display panel 1110 and the touch panel 1520 are combined in the stack structure According to example embodiments, the display unit 1100 may display one of a plurality of pages, which are virtually listed, on a screen of the mobile device 100. The display unit 1100 may also sequentially display the plurality of pages that are virtually listed.

The display unit 1100 may list and display a plurality of event areas into which a plurality of icons may be inserted.

The controller 1200 may include, for example, at least one selected from a random access memory (RAM) 1210, a read-only memory (ROM) 1220, a central processing unit (CPU) 1230, a graphic processing unit (GPU) 1240, and a bus 1250. The RAM 1210, the ROM 1220, the CPU 1230, and the GPU 1240 may be connected to one another through the bus 1250.

The CPU 1230 accesses the memory 1300 to perform booting by using an operating system (OS) stored in the memory 1300. The CPU 1230 performs various types of operations using various types of programs, contents, data, etc. stored in the memory 1300.

The ROM 1220 stores a command set, etc. for booting a system. For example, if power is supplied to the mobile device 100 through an input of a turn-on command, the CPU 1230 may copy the OS stored in the memory 1300 into the RAM 1210 based on a command stored in the ROM 1220 and may execute the OS to boot the system. If the booting of the system is completed, the CPU 1230 copies various types of programs stored in the memory 1300 into the RAM 1210 and executes the programs copied into the RAM 1210 to perform various types of operations. If booting of the mobile device 100 is completed, the GPU 1240 displays a user interface (UI) screen in an area of the display unit 1100. Also, a screen generated by the GPU 1240 may be provided to the display unit 1100 to be displayed in each area of the display unit 1100.

According to example embodiments, the controller 1200 may be configured to respectively insert images, indicating execution screens of widgets respectively corresponding to adjacent pages of a displayed page, into the adjacent pages. For example, the adjacent pages may be a page positioned before the displayed page and a page positioned after the displayed page.

For example, if a scroll input for the displayed page is received through the input unit 1500, the controller 1200 may be configured to acquire information about the widgets corresponding to the adjacent pages. The controller 1200 may also be configured to display the widgets corresponding to the adjacent pages on a virtual screen. Also, the controller 1200 may be configured to capture the execution screens of the widgets displayed on the virtual screen. The controller 1200 may be configured to respectively insert captured images of the widgets into the adjacent pages.

The controller 1200 may be configured to generate containers respectively corresponding to a plurality of pages that are listed to include a home screen of the mobile device 100. The containers may, for example, store identification values of the pages, identification values of the widgets corresponding to the pages, and display data. The containers may also include, for example, order information of the listed pages. The containers may include position information (e.g., coordinate information) that the pages respectively have with respect to the screen of the mobile device 100.

If a scroll input for the displayed page is received through the input unit 1500, the controller 1200 may be configured to update the position information that the pages respectively have with respect to the screen of the mobile device 100. The controller 1200 may update the containers based on the updated position information.

If an adjacent page is displayed, the controller 1200 may also be configured to update a captured image inserted into the adjacent page at each preset time interval.

The controller 1200 may be configured to generate notification information. The controller 1200 may be configured to generate a page into which the notification information will be inserted. The generated page may be arranged with the plurality of pages that are listed.

If icons are moved as an input is received through the input unit 1500, the controller 1200 may be configured to move event areas corresponding to the moved icons.

The memory 1300 may include, for example, at least one selected from an internal memory (not shown) and an external memory (not shown).

For example, the internal memory may include at least one selected from a volatile memory (e.g., a dynamic RAM (DRAM), a static RAM (SRAM), a synchronous dynamic RAM (SDRAM), or the like), a nonvolatile memory (e.g., an one time programmable ROM (OTPROM), a programmable ROM (PROM), an erasable and programmable ROM (EPROM), an electrically erasable and programmable ROM (EEPROM), a mask ROM, a flash ROM, or the like), a hard disk drive (HDD), and a solid state drive (SSD), or the like.

According to example embodiments, the controller 1200 may be configured to load a command or data, which is received from at least one selected from a nonvolatile memory and other elements, into a volatile memory and process the command or data. The controller 1200 may also be configured to keep data, which is received or generated from another element, in a nonvolatile memory.

The external memory may, for example, include at least one selected from a compact flash (CF), a secure digital (SD), a micro-SD, a min-SD, an extreme digital (xD), and a memory stick, or the like.

The memory 1300 may store various types of programs and data used for an operation of the mobile device 100. For example, the memory 1300 may temporarily or semi-permanently store at least a portion of a content that will be displayed on a lock screen.

The communicator 1400 may include, for example, communication circuitry configured to communicate with various types of external devices based on various types of communication methods. The communicator 1400 may include at least one selected from a WiFi chip 1410, a Bluetooth chip 1420, a wireless communication chip 1430, and a near field communication (NFC) chip 1440, etc. The controller 1200 may be configured to transmit and receive calls and messages with various types of external devices using the communicator 1400.

The WiFi chip 1410 and the Bluetooth chip 1420 may respectively perform communications based on a WiFi method and a Bluetooth method. If the WiFi chip 1410 or the Bluetooth chip 1420 is used, the communicator 1400 may be configured to transmit and receive various types of connection information, such as a subsystem identification (SSID), a session key, etc., to connect communications using the various types of connection information, and to transmit and receive various types of information. The wireless communication chip 1430 refers to a chip that performs communications according to various types of communication standards such as IEEE, Zigbee, 3rd Generation (3G), $3^{rd}$ Generation Partnership Project (3GPP), Long Term Evolution (LTE), etc. The NFC chip 1440 refers to a chip that operates according to an NFC method using a band of 13.56 MHz among various types of radio frequency identification (RFID) frequency bands such as 135 kHz, 13.56 MHz, 433 MHz, 860 MHz to 960 MHz, 2.45 GHz, etc.

The video processor 1600 may process video data included in content received through the communicator 1400 or a content stored in the memory 1300. The video processor 1600 may perform various types of image processing, such as decoding, scaling, noise filtering, frame rate converting, resolution converting, etc., with respect to the video data.

The audio processor 1650 may process audio data included in content received through the communicator 1400 or a content stored in the memory 1300. The audio processor 1650 may perform various types of processing, such as decoding, amplifying, noise filtering, etc., with respect to the audio data.

If a play program for a multimedia content is executed, the controller 1200 may drive the video processor 1600 and the audio processor 1650 to play a corresponding content. The speaker 1800 may output the audio data generated by the audio processor 1650.

The input unit 1500 may receive various types of commands. The input unit 1500 may include, for example, at least one selected from a key 1510, a touch panel 1520, and a pen recognition panel 1530.

The touch panel 1520 may sense a touch input and output a touch event value corresponding to a sensed touch signal. According to example embodiments, the touch panel 1520 may receive a touch input including at least one selected from tap, touch and hold, double tap, drag, panning, flick, and drag and drop, etc. of the user. If the touch panel 1520 is combined with the display panel 1110 to form a touch screen (not shown), the touch screen may be realized as various types of touch sensors such as a capacitive type, a resistive type, a piezoelectric type, etc.

The capacitive type is a method of sensing micro electricity excited into a body of the user when a part of the body of the user touches a surface of the touch screen, by using a dielectric coated on the surface of the touch screen to determine touch coordinates. The resistive type is a method of sensing a current flowing due to a contact between upper and lower electrode plates of the touch screen if the user touches the touch screen, to determine touch coordinates. A touch event generated from the touch screen may be mainly generated, for example, by a finger of a human or may be generated by a conductive material that may apply a capacitance change.

The key 1510 may include, for example, various types of keys such as a mechanical button, a wheel, etc. that are formed in various areas such as a front part, a side part, a back part, etc. of an external appearance of a main body of the mobile device 100.

The pen recognition panel 1530 may sense a proximity input or a touch input of a pen according to an operation of a touch pen of the user (e.g., a stylus pen, a digitizer pen, or the like) and output a sensed pen proximity event or pen touch event. The pen recognition panel 1530 may, for example, be realized as an electromagnetic radiation (EMR) type and may sense a touch or proximity input based on changes in a strength of an electromagnetic field caused by a proximity or touch of a pen. For example, the pen recognition panel 1530 may include an electromagnetic induction coil sensor (not shown) that has a grid structure and an electric signal processor (not shown) that sequentially provides an alternating current (AC) signal having a preset frequency to loop coils of the electromagnetic induction coil sensor. If a pen having a resonance circuit exists around a loop coil of the pen recognition panel 1530, a magnetic field transmitted from the corresponding loop coil generates a current in the resonance circuit of the pen based on a mutual electromagnetic induction. Based on this current, an induction magnetic field is generated from a coil constituting the resonance circuit of the pen. The pen recognition panel 1530 may detect the induction magnetic field from the loop coil, which is in a signal reception state, to sense a proximity position or a touch position of the pen. The pen recognition panel 1530 may be provided under the display panel 1110 to have a preset area, e.g., an area capable of covering a display area of the display panel 1110.

According to example embodiments, the input unit 1500 may receive a scroll input for a displayed page. For example, the input unit 1500 may receive a touch input that drags, flicks, or swipes the screen of the mobile device 100.

The input unit 1500 may also receive an input for one of icons inserted into a plurality of event areas. For example, the input unit 1500 may receive a touch input of the user that drags and drops an icon displayed on the screen of the mobile device 100 from a first event area into a second event area.

The microphone 1700 receives a user voice or other sounds and converts the user voice or the other sounds into audio data. The controller 1200 may be configured to use the user voice input through the microphone 1700 in a call operation or to convert the user voice into audio data and store the audio data in the memory 1300.

The imaging unit 1750 may capture a still image or a moving image under control of the user. The imaging unit 1750 may be realized as a plurality of imaging units such as a front camera, a rear camera, etc.

If the imaging unit 1750 and the microphone 1700 are provided, the controller 1200 may be configured to control operation based on the user voice input through the microphone 1700 or a user motion recognized by the imaging unit 1750. For example, the mobile device 100 may operate in a motion control mode or a voice control mode. If the mobile device 100 operates in the motion control mode, the controller 1200 may be configured to activate the imaging unit 1750 to capture the user and track a motion change of the user to perform a control operation corresponding to the motion change of the user. If the mobile device 100 operates in the voice control mode, the controller 1200 may be configured to analyze the user voice input through the microphone 1700 and operate in a voice recognition mode that performs a control operation according to the analyzed user voice.

The motion sensor 1850 may sense a motion of the main body of the mobile device 100. The mobile device 100 may rotate or incline in various directions. For example, the motion sensor 1850 may sense a motion characteristic, such as a rotation direction, an angle, a slope, etc., using at least one selected from various types of sensors such as a geomagnetic sensor, a gyro sensor, an acceleration sensor, etc.

According to example embodiments, although not shown in FIG. 16, the mobile device 100 may further include various types of external input ports for connecting the mobile device 100 to various types of external terminals, such as a universal serial bus (USB) port to which a USB connector may be connected, a headset, a mouse, a local area network (LAN), etc., a digital multimedia broadcasting (DMB) chip that receives and processes a DMB signal, various types of sensors, etc.

Names of elements of the mobile device 100 described above may be changed. Also, the mobile device 100 according to the example embodiments may include at least one selected from the above-described elements, and some of the elements may be omitted or other elements may be further included.

The example embodiments and all functional operations described herein may be embodied in a digital electronic circuit or in structures disclosed herein, computer software, firmware, or hardware (e.g., configurable circuitry) including equivalent structures of the disclosed structures, or combinations of at least one or more thereof.

A computer-readable medium may be an arbitrarily available medium that may be accessed by a computer and may include all of a volatile medium, a nonvolatile medium, a separable type medium, and a non-separable type medium. The computer-readable medium may also include all of a computer storage medium and a communication medium. The computer storage medium may include all of a volatile medium, a nonvolatile medium, a separable medium, and a non-separable medium that are embodied through an arbitrary method or technology for storing information such as a computer-readable command, a data structure, a program module, or other pieces of data. The communication medium includes a computer-readable command, a data structure, a program module, other pieces of data of a modulated data signal such as or the like, or other transmission mechanisms and arbitrary information transmission media.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of displaying pages on a mobile device, the method comprising:
   generating containers corresponding to a plurality of virtually listed pages which have display sequence for displaying on a screen;
   displaying one of the plurality of virtually listed pages on a screen of the mobile device;
   receiving a scroll input on the displayed page; and
   inserting images of execution screens of widgets corresponding to pages adjacent to the displayed page, into the adjacent pages, in response to receiving the scroll input,
   wherein the containers store at least one of: identification values of the pages, identification values of widgets corresponding to the pages, and captured images of the execution screens of the widgets.

2. The method of claim 1, wherein the inserting of the images of the execution screens of the widgets comprises:
   capturing execution screens of the widgets in response to the scroll input; and
   inserting the captured images into the respective adjacent pages.

3. The method of claim 2, wherein, in response to the scroll input on the displayed page, the adjacent pages are displayed on the screen of the mobile device.

4. The method of claim 3, wherein, if the adjacent pages are displayed, the captured images inserted into the adjacent pages are updated at preset time intervals.

5. The method of claim 1, wherein the widgets corresponding to the adjacent pages of the displayed page include a widget corresponding to an adjacent page positioned before the displayed page, and a widget corresponding to an adjacent page positioned after the displayed page.

6. The method of claim 1, further comprising:
generating notification information; and
generating a page into which the notification information is to be inserted,
wherein the generated page is arranged together with the plurality of pages.

7. The method of claim 1, wherein the plurality of pages comprise a home screen of the mobile device.

8. A non-transitory computer-readable recording medium having recorded thereon a program for executing the method of claim 1 in a computer.

9. A mobile device comprising:
a display configured to display one of a plurality of virtually listed pages on a screen of the mobile device;
input circuitry configured to receive a scroll input on the displayed page; and
a controller configured to:
insert images of execution screens of widgets corresponding to pages adjacent to the displayed page, into the adjacent pages based on the scroll input; and
generate containers corresponding to the plurality of pages, wherein the containers are configured to store at least one of: identification values of the pages, identification values of the widgets corresponding to the pages, and captured images of the execution screens of the widgets,
sequentially display the plurality of virtually listed pages on the screen of the mobile device.

10. The mobile device of claim 9, wherein, the controller is configured to capture the execution screens of the widgets and to the captured images into the adjacent pages in response to the scroll input.

11. The mobile device of claim 10, wherein, the adjacent pages are displayed on the screen of the mobile device in response to the scroll input on the displayed page.

12. The mobile device of claim 11, wherein, the controller is configured to update the captured images inserted into the adjacent pages at preset time intervals if the adjacent pages are displayed.

13. The mobile device of claim 9, wherein the widgets corresponding to the pages adjacent to the displayed page include a widget corresponding to an adjacent page positioned before the displayed page and a widget corresponding to an adjacent page positioned after the displayed page.

14. The mobile device of claim 9, wherein the controller is configured to generate notification information and to generate a page into which the notification page is to be inserted,
wherein the generated page is arranged together with the plurality of pages.

15. The mobile device of claim 9, wherein the plurality of pages comprise a home screen of the mobile device.

* * * * *